United States Patent [19]
Hassan et al.

[11] Patent Number: 5,821,717
[45] Date of Patent: Oct. 13, 1998

[54] METHOD AND CIRCUIT FOR DRIVING A HARD DISK DRIVE SPINDLE MOTOR

[75] Inventors: Mehedi Hassan, Plano; Robert E. Whyte, Dallas; James E. Chloupek, Plano, all of Tex.

[73] Assignee: Texas Instruments Incorporated, Dallas, Tex.

[21] Appl. No.: 872,464

[22] Filed: Jun. 10, 1997

Related U.S. Application Data

[60] Provisional application No. 60/019,571 Jun. 11, 1996.
[51] Int. Cl.⁶ ................................................. G05B 11/01
[52] U.S. Cl. ...................... 318/560; 318/569; 318/599; 318/254; 318/138; 318/439; 318/567; 318/368
[58] Field of Search ........................ 318/569, 560, 318/599, 254, 138, 567, 439, 368; 395/800; 369/44.29

[56] References Cited

U.S. PATENT DOCUMENTS

| | | | |
|---|---|---|---|
| 4,928,043 | 5/1990 | Plunkett | 318/254 |
| 5,091,680 | 2/1992 | Palm | 318/368 |
| 5,161,073 | 11/1992 | Gami et al. | 360/73.03 |
| 5,276,569 | 1/1994 | Even | 360/73.02 |
| 5,313,648 | 5/1994 | Ehlig et al. | 395/800 |
| 5,327,053 | 7/1994 | Mann et al. | 318/254 |
| 5,446,353 | 8/1995 | Schowe | 318/254 |
| 5,629,912 | 5/1997 | Okawa et al. | 369/44.29 |

*Primary Examiner*—Karen Masih
*Attorney, Agent, or Firm*—Bret J. Petersen; W. Daniel Swayze, Jr.; Richard L. Donaldson

[57] ABSTRACT

A system for driving a hard disk drive spindle motor is disclosed. The system comprises a spindle motor control circuit (120) and a spindle motor power circuit (220). The system also includes at least one disk (22) attached to a rotatable spindle (21) and a spindle motor (400) which receives power signals from the spindle motor power circuit (220) and controls the rotation of the spindle (21). The spindle motor control circuit (120) comprises a multiplexor (127) which transmits either a pulse width modulation signal or a current control signal in response to a mode selection signal, and a spindle predriver (125) which receives the multiplexor output signal and transmits spindle motor control signals to the spindle motor power circuit (220).

18 Claims, 2 Drawing Sheets

METHOD AND CIRCUIT FOR DRIVING A HARD DISK DRIVE SPINDLE MOTOR

This application claims benefit of USC Provisional Application No. 60/019,571, filed Jun. 11, 1996.

TECHNICAL FIELD OF THE INVENTION

This invention relates generally to the field of disk drive circuits and more particularly to a method and circuit for driving a hard disk drive spindle motor.

BACKGROUND OF THE INVENTION

A hard disk drive generally includes a stack of rotating disks or platters, a spindle motor which causes the disks to rotate, read/write heads which fly above the surface of the disks, an actuator motor (known as a "voice coil motor" or VCM) which controls the positioning of the read/write heads, power circuitry to provide electrical power to the spindle and voice coil motors, and control circuitry to control the operation of the spindle and voice coil motors.

A read/write head reads data from a disk by sensing flux changes on the magnetic surface of the disk as it passes beneath the read/write head. To synchronize the data being read from the disk with the operation of the data processing circuitry, it is necessary to carefully control the speed of rotation of the disks. This is accomplished by controlling the current delivered to the spindle motor.

Current control is generally effected in one of two ways. The first is pulse width modulation, in which the driving current is modulated by a square wave. Current is delivered to the spindle motor only when the square wave is high. The duty cycle of the pulse width modulation signal therefore determines the average current delivered to the spindle motor.

The other mode of current control is known as linear current control. In this mode, an analog voltage input signal is provided which is proportional to the current to be delivered to the spindle motor. The spindle motor control circuitry processes this input signal and adjusts the level of current delivered by the power circuitry accordingly.

In the past, these two modes of current control were only available on separate integrated circuit chips. Thus, if a hard disk drive manufacturer wished to produce one type of hard disk drive with pulse width modulation, and another type of hard disk drive with linear current control, the manufacturer had to design and manufacture a separate integrated circuit chip for each type of hard disk drive. Since integrated circuit chips are expensive to design and manufacture, it would be advantageous to have both linear current control and pulse width modulation available for selection on the same chip, so that a single generic chip could be used in either a pulse width modulation system or a linear current control system.

SUMMARY OF THE INVENTION

The present invention provides a user selectable current control system for driving a hard disk drive spindle motor. According to one embodiment, both linear current control and pulse width modulation control are available, so that a single device can be used with a pulse width modulation system or a linear current control system.

An embodiment of the present invention includes a system for driving a hard disk drive spindle motor. The system includes a spindle motor control circuit and a spindle motor power circuit. The spindle motor control circuit includes a multiplexor which transmits either a pulse width modulation signal or a current control signal in response to a mode selection signal, and a spindle predriver which receives the multiplexor output signal and transmits spindle motor control signals to the spindle motor power circuit.

A technical advantage of the present invention is that a method and system for driving a hard disk drive spindle motor are provided. Another technical advantage is that either pulse width modulation or linear current control can be selected for controlling the rotation speed of the spindle motor.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE INVENTION

Figure 1:
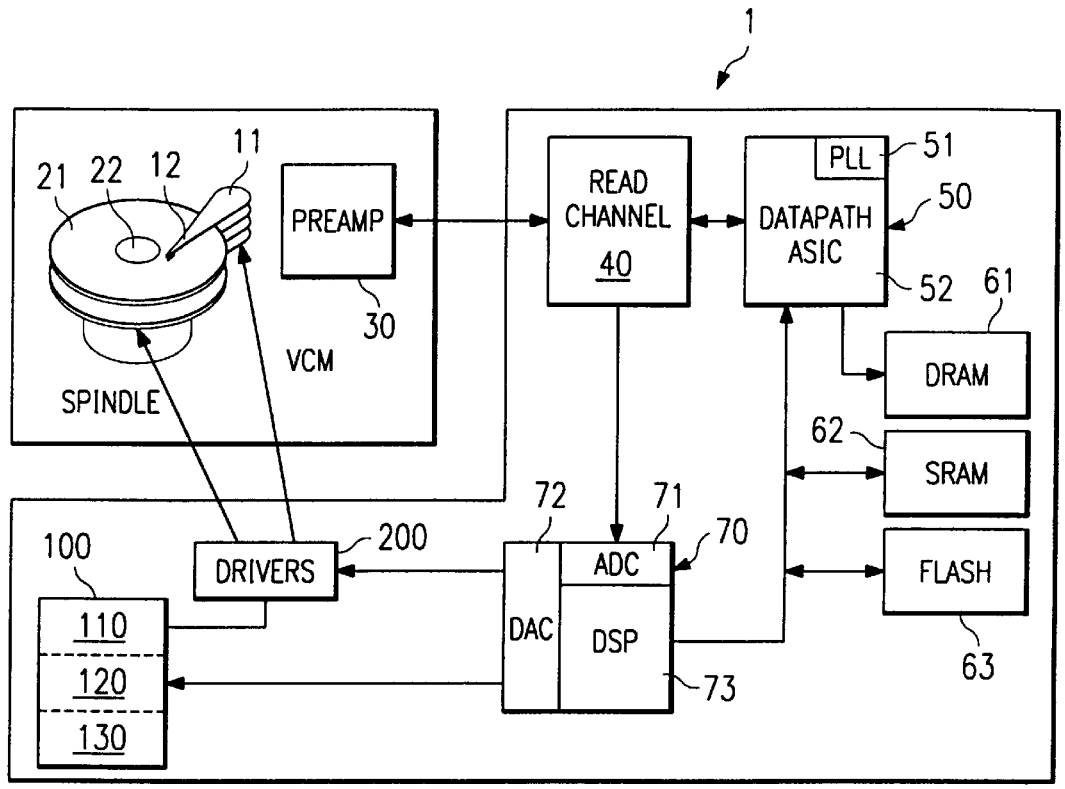
FIG. 1 is an overall block diagram of a hard disk drive system.
Figure 3:
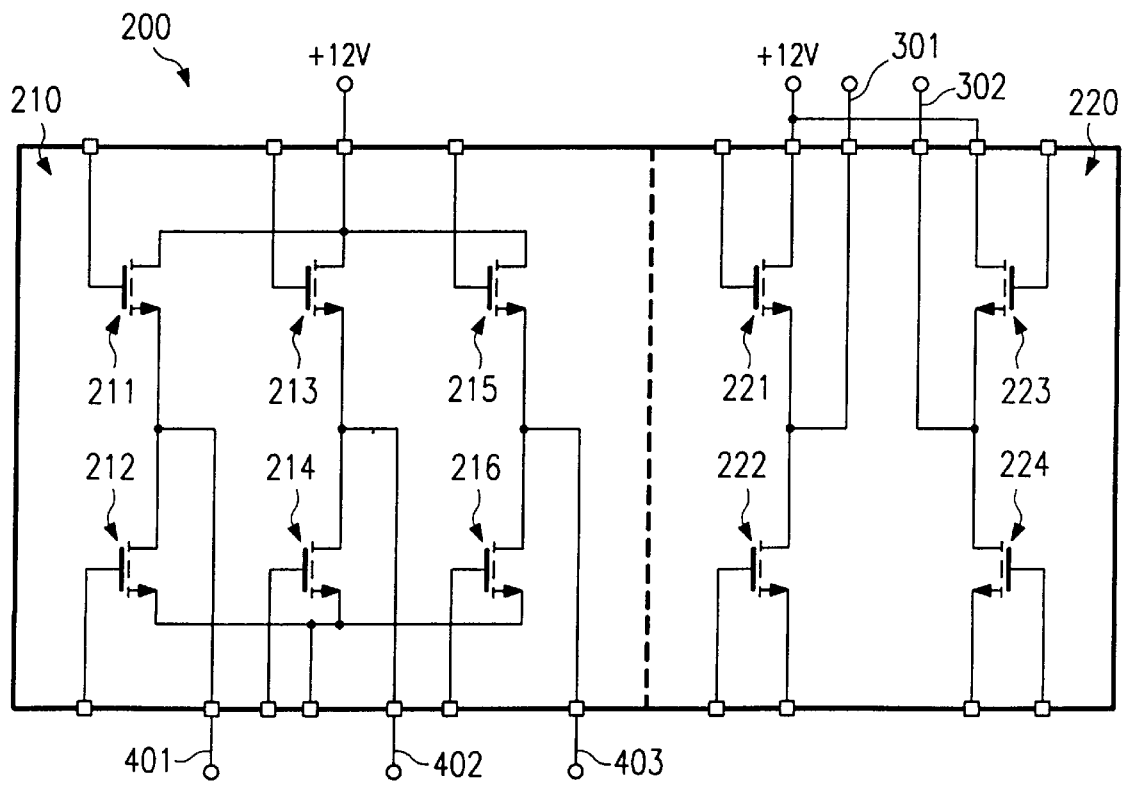
FIG. 3 is a schematic diagram of the actuator and spindle power circuitry in accordance with the invention.
Figure 2:
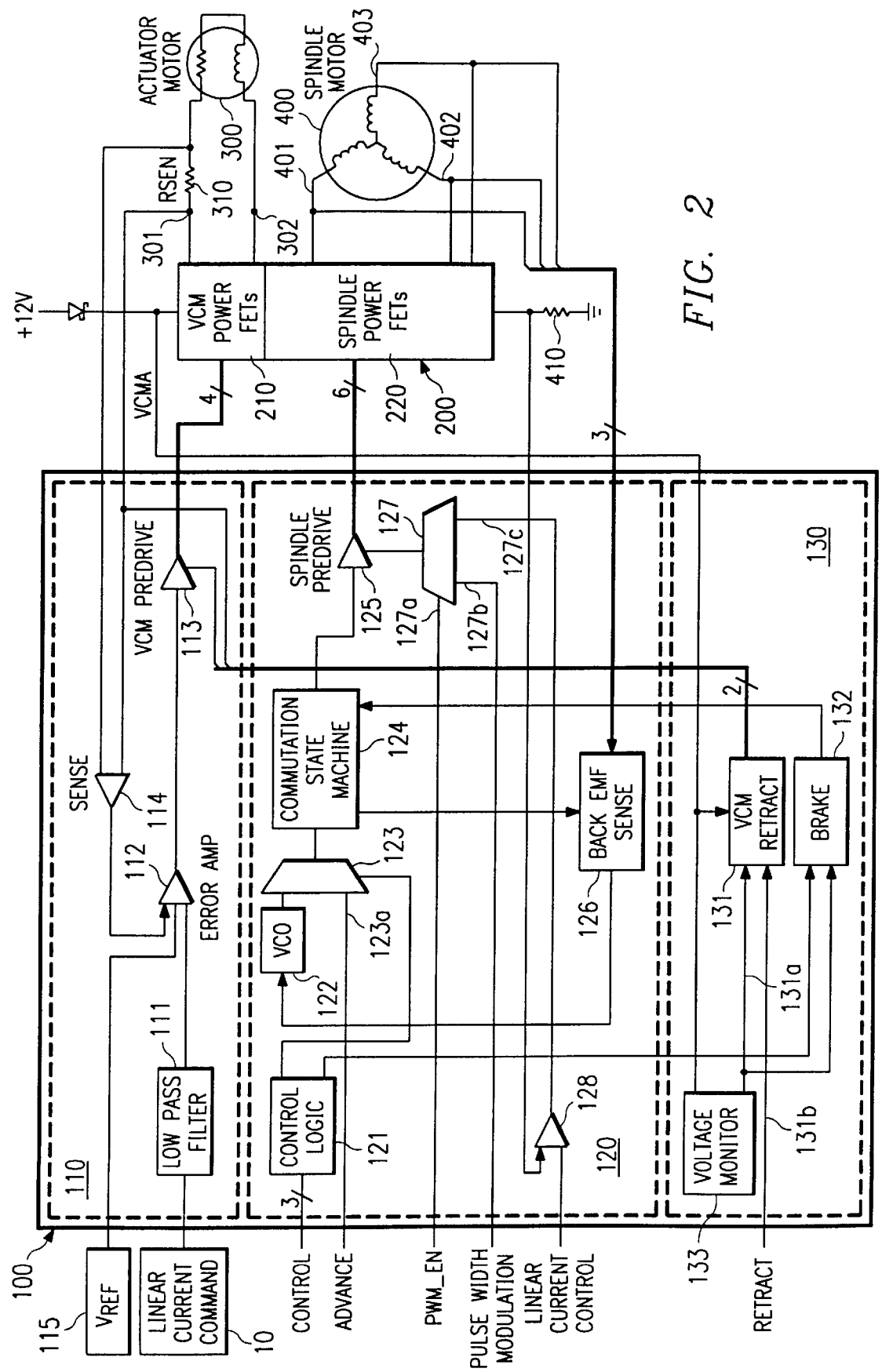
FIG. 2 is a block diagram of the power and control circuitry for hard disk drive actuator and spindle motors in accordance with the invention.

The preferred embodiment of the present invention and its advantages are best understood by referring to FIGS. 1 through 3 of the drawings, like numerals being used for like and corresponding parts of the various drawings.

Referring to FIG. 1, an overall block diagram of a disk drive in accordance with the invention is shown. Hard disk drive 1 includes a plurality of disks 21 mounted on a rotatable spindle 22. The spindle 22 is rotated by a spindle motor (not shown).

Each disk 21 has magnetic recording surfaces on both sides of the disk. Read heads 12 are mounted on actuator arms 11, which are moved in unison by an actuator motor (not shown). The read heads 12 detect magnetic flux changes on the surfaces of the disks 21. Each flux change produces a signal which is read by a pre-amplifier 30. The preamplifier 30 transmits the signal to read channel 40, which decodes and otherwise processes the signal. An example of a function performed by read channel 40 is partial response, maximum likelihood detection using a Viterbi detector.

The read channel 40 sends the decoded data to block 50, which includes a phase-locked loop 51. The phase-locked loop 51 communicates with the read channel 40 to ensure that the data is read from the disk with proper synchronization. Block 50 also includes an application-specific integrated circuit (ASIC) 52, which processes the decoded data and communicates with the read channel 40, dynamic RAM unit 61, static RAM unit 62, flash memory unit 63, and digital signal processing block 70.

Read channel 40 sends the decoded data in analog form to digital signal processing block 70. This block includes an analog-to-digital converter 71, digital signal processing circuitry 73, and a digital-to-analog converter 72. Digital signal processing block 70 sends signals to motor control blocks 110, 120 on control chip 100 indicating what actions the spindle and actuator motors should take next. Support function block 130 on control chip 100 performs support functions described below.

Referring to FIG. 2, a functional block diagram of the disk drive motor power and control circuitry is shown.

Control chip 100 is a bi-CMOS chip which includes actuator control block 110, spindle control block 120, and support function block 130.

Power chip 200 is a DMOS chip which includes actuator power block 220 and spindle power block 210, each power block having a plurality of power FETs (shown in FIG. 3). Actuator power block 220 supplies a selected current to the voice coil motor 300, while spindle power block 210 supplies a desired current to spindle motor 400.

Actuator control block 110 includes low pass filter 111, error amplifier 112, actuator motor predrive amplifier 113, and sense amplifier 114. A current control device 10, which may be, for example, a part of digital signal processing block 70, supplies an input voltage representative of the desired actuator current. This voltage is filtered by low pass filter 111. Sense amplifier 114 produces an output signal proportional to the actual current passing through actuator 300 by sensing and amplifying the voltage drop across sense resistor 310.

Error amplifier 112 receives the output of sense amplifier 114 ($V_{SENSE}$), the output of low pass filter 111 ($V_{INPUT}$), and a reference voltage from reference source 115 ($V_{REF}$), which may be generated on control chip 100. Error amplifier 112 takes the difference between the output of sense amplifier 114 and the output of low pass filter 111. This difference voltage is then compared to the reference voltage from reference source 115, and the difference between the two voltages is amplified to produce a target voltage ($V_{TARGET}$). The target voltage is proportional to the difference between the desired and actual actuator currents, with a voltage offset, as follows:

$$(1) \quad V_{TARGET} = c^*(V_{INPUT} - V_{SENSE} - V_{REF})$$

The target voltage is the desired voltage across actuator motor nodes 301 and 302. This desired driving voltage is attained in a manner to be described below.

Referring to FIG. 3, actuator power block 220 includes FETs 221–224. The gates of FETs 221–224 receive four bits of output from actuator motor control block 110, and more specifically from actuator motor predrive amplifier 113. The high side FETs 221 and 223 have drains connected to a high voltage, while the low side FETs 222 and 224 have sources connected to ground. The sources of high side FETs 221 and 223 are connected to the drains of low side FETs 222 and 224, respectively, and to the actuator motor nodes 301 and 302, respectively.

Referring once again to FIG. 2, actuator motor predrive amplifier 113 sends analog output signals to the gates of power FETs 221–224 (shown in FIG. 3), which act as voltage-controlled resistors. During normal operation, actuator motor predrive amplifier 113 turns off one high side FET 221 or 223 and one low side FET 222 or 224. The two FETs turned off are not connected to the same node 301 or 302. Thus, one high side FET will act as a controlled resistance between actuator motor 300 and the voltage source, while one low side FET will act as a controlled resistance between actuator motor 300 and ground. Actuator motor predrive amplifier 113 can therefore control both the direction and magnitude of current flowing through actuator motor 300.

Actuator motor predrive amplifier 113 adjusts the resistances of FETs 221–224 so that the voltage between nodes 301 and 302 equals the target voltage calculated in equation (1) above. Actuator motor predrive amplifier 113 therefore "amplifies" its input voltages indirectly, through manipulation of the gate voltages of FETs 221–224.

Spindle control block 120 includes control logic block 121, voltage controlled oscillator 122, multiplexors 123 and 127, commutation state machine 124, spindle predriver 125, back-EMF sense-and-compare block 126, and transconductance amplifier 128. Control logic block 121 receives from digital signal processing block 70 a three-bit control input which selects the desired running mode of the spindle motor. Possible selected modes include startup, run, coast, and brake.

In the startup mode, control logic block 121 sends a signal to multiplexor 123 so that commutation state machine 124 is advanced by an external signal from digital signal processing block 70 on input line 123*a*. In the run mode, control logic block selects multiplexor 123 so that commutation state machine 124 is advanced by a signal from voltage controlled oscillator 122.

As is well understood in the art of disk drive control circuitry, commutation state machine 124 produces six output signals which control high side and low side power FETs for each of the three phase inputs 401–403 of spindle motor 400. Commutation state machine 124, through spindle predriver 125, switches FETs 211–216 (shown in FIG. 3) in synchronization with the rotation of spindle motor 400 so as to provide the desired torque to spindle motor 400. For example, in the run mode, the desired torque will be in the direction of rotation of spindle motor 400, while in the brake mode the desired torque will be in the opposite direction.

In the run mode, back-EMF sense-and-compare block 126 receives an input signal from nodes 401–403 indicative of the EMF generated on the idle (undriven) one of the spindle motor phase inputs 401–403. This back-EMF signal is compared to the output of the commutation state machine 124 to determine whether the output of the commutation state machine 124 is in the desired phase relationship with the actual rotation of the spindle motor 400.

If the commutation state machine 124 is out of phase with the rotation of the spindle motor 400, then the desired torque will not be applied to the spindle motor 400 and the desired rate of rotation will not be achieved. To correct this situation, the back-EMF sense-and-compare block 126 will increase or decrease its output signal to the voltage controlled oscillator 122 so as to increase or decrease the rate at which the commutation state machine 124 is advanced, thus correcting the phase relationship of the commutation state machine 124 and the rotation of the spindle motor 400.

Referring to FIG. 3, spindle motor power block 210 includes FETs 211–216. The gates of FETs 211–216 receive the six bits of output from spindle motor control block 120. The high side FETS 211, 213, 215 have drains connected to a supply voltage, while the low side FETS 212, 214, 216 have sources connected indirectly to ground. The sources of high side FETs 211, 213, 215 are connected to the drains of low side FETs 212, 214, 216, respectively, and to spindle motor input nodes 401–403, respectively. Thus, for example, when high side FET 211 is switched on while low side FET 212 is switched off, the supply voltage will be applied to node 401. Conversely, if FET 211 is off and FET 212 is on, node 401 will be grounded.

Referring once again to FIG. 2, spindle motor 400 is a three-phase motor, as is well understood in the art. To provide torque to the motor, one of the nodes 401–403 must be at a high potential, while another one of the nodes must be grounded. Commutation state machine 124 and spindle predriver 125 switch FETs 211–216 in succession to provide the desired torque to spindle motor 400.

The spindle control block 120 can control the current driving the spindle motor 400 by means of either pulse width modulation or linear current control. Multiplexor 127 receives a select input at input port 127*a* which determines whether pulse width modulation or linear current control is to be used. A pulse width modulation signal is received at input port 127*b*, while an analog current control signal is received at input port 127*c*. These signals may be received, for example, from digital signal processing block 70. Multiplexor 127 supplies the input type selected by the select input signal to spindle predriver 125.

When pulse width modulation is selected, the duty cycle of the spindle predriver output is controlled by the duty cycle of the pulse width modulation signal. When the pulse width modulation signal is low, the spindle predriver 125 pulls the gates of low side FETs 212, 214, 216 to ground, thus turning these FETs off. In this state, no current flows through spindle motor 400. When the pulse width modulation signal is high, spindle predriver 125 operates normally and turns on the appropriate low side FET as indicated by commutation state machine 124. Thus, current flows through spindle motor 400 only when the pulse width modulation signal is high. The average current delivered to spindle motor 400 depends on the duty cycle of the pulse width modulation signal.

When linear current control is selected, an analog control signal which is proportional to the desired spindle motor current is received by transconductance amplifier 128. Sense resistor 410 is connected between the sources of low side FETs 212, 214, 216 and a ground potential. The voltage drop across sense resistor 410 is therefore proportional to the actual current flowing through spindle motor 400. Amplifier 128 compares this voltage to the linear current control voltage, and supplies an analog output signal to spindle predriver 125, which applies this voltage to the gate of the low side power FET 212, 214, 216 presently selected by commutation state machine 124. The selected low side power FET will then conduct a drain-source current which is proportional to the output of amplifier 128.

Support function block 130 contains voltage monitor 133, actuator retract block 131 and spindle brake block 132. Voltage monitor 133 monitors the supply voltage received by the hard disk drive. When the supply voltage drops below a threshold level, voltage monitor 133 sends a fault signal to actuator retract block 131 and spindle brake block 132.

Actuator retract block 131 receives input signals, for example from digital signal processing block 70, indicating when the read head should be retracted to an area of the disk on which data is not stored. This may occur when power to the hard drive is lost, when the supply voltage sags, or when the drive is "parked" by the user for any reason.

When the supply voltage decreases, fast retraction of the read heads is desirable because each read head is literally flying on a cushion of air above its respective disk surface. A read head will "crash" into the disk if the disk rotation rate decreases to a critical level. Therefore, when power to the spindle motor is lost or diminished, the head must be moved to a safe area of the disk where it can "land." To this end, when actuator retract block 131 receives a fault signal from voltage monitor 133 on input port 131*a* indicating a loss of supply voltage, an output signal is sent to actuator motor predrive amplifier 113 causing fast retraction of the read head.

When a head retract is requested for some non-critical reason, a slower retraction is desirable so as to avoid potential damage to the read heads caused by sudden acceleration. Thus, when a retract signal is received on input port 131*b*, actuator retract block 131 sends an output signal to actuator motor predrive amplifier 113 causing slow retraction of the read head.

When the hard disk drive is to be shut down, it is desirable to allow the disks to coast freely, gradually slowing their rate of rotation, until a critical speed is reached. At the critical speed, it is desirable to stop the rotation of the disks suddenly, so that when the read heads "land," they need not travel a long distance in contact with the disk surface.

Thus, spindle brake block 132 receives input signals, including the output signal from voltage monitor 133, indicating when the rotation of the spindle motor 400 should be stopped. In response to these signals, spindle brake block 132 sends an output signal to commutation state machine 124 causing it to reverse the direction of the torque applied to spindle motor 400.

The amount of power which must be driven by power chip 200 varies with the type of actuator and spindle motor used. Thus, a different power chip is required to drive different disk drive motors 300, 400. However, one advantage of the above-described system in accordance with the invention is that the control signals for each power chip are the same. Thus, the same control chip 100 can be used with different power chips 200 and disk drive motors 300, 400. Another advantage is that either pulse width modulation or linear current control can be selected to control the spindle motor 400.

While the invention has been particularly shown and described by the foregoing detailed description, it will be understood by those skilled in the art that various other changes in form and detail may be made without departing from the spirit and scope of the invention.

What is claimed is:

1. A system for driving a hard disk drive spindle motor, comprising:

a spindle motor control circuit for generating a plurality of spindle motor control signals, the spindle motor control circuit having:

a multiplexor for receiving a mode selection signal, a pulse width modulation signal, and a first current control signal, for selecting one of the pulse width modulation signal and the first current control signal in response to the mode selection signal, and for generating an output signal equal to the selected one of the pulse width modulation signal and the first current control signal; and a spindle predriver for receiving the multiplexor output signal, and for generating the spindle motor control signals; and a spindle motor power circuit, for receiving the spindle motor control signals and for supplying a plurality of spindle motor power signals to the spindle motor.

2. The system of claim 1, wherein the spindle motor power circuit comprises:

a plurality of output conductors, each output conductor being connected to one of a plurality of input ports of the spindle motor, each output conductor conducting a corresponding one of the spindle motor power signals;

a plurality of high side power transistors, each transistor having a gate terminal for receiving a corresponding one of the spindle motor control signals, a drain terminal connected to a voltage source, and a source terminal connected to a corresponding one of the output conductors, each transistor conducting a current from the voltage source to the corresponding output conductor in response to the corresponding spindle control signal; and a plurality of low side power transistors, each transistor having a gate terminal for receiving a corresponding one of the spindle motor control signals and a drain terminal connected to a corresponding one of the output conductors, each transistor conducting a current from the corresponding output conductor in response to the corresponding spindle control signal.

3. The system of claim 2, wherein the spindle motor control signals comprise high side control signals and low side control signals, each high side control signal being supplied to the gate of a corresponding one of the high side power transistors, each low side control signal being supplied to the gate of a corresponding one of the low side power transistors.

4. The system of claim 1, wherein the spindle motor control circuit further comprises:
a current sensor for detecting a current conducted by the spindle motor, and for generating an output signal; and
a transconductance amplifier, for receiving a second current control signal and the output signal of the current sensor, and for generating the first current control signal.

5. The system of claim 4, wherein the current sensor comprises:
a resistor having first and second terminals, the first terminal being connected to a ground potential, for conducting the current conducted by the spindle motor to the ground potential; and
an output conductor connected to the second terminal of the resistor, for conducting the output signal of the current sensor.

6. The system of claim 1, wherein the spindle motor control circuit further comprises:
a voltage-controlled oscillator for receiving an oscillator control signal and for generating an oscillator output signal; and
a commutation state machine for receiving the oscillator output signal, for generating a plurality of transistor selection signals, and for supplying the transistor selection signals to the spindle predriver.

7. The system of claim 6, wherein the spindle motor control circuit further comprises a phase detector for receiving a phase indication signal from the spindle motor, for receiving the transistor selection signals from the commutation state machine and for generating the oscillator control signal.

8. A hard disk drive system comprising:
a disk attached to a rotatable spindle, the disk having a magnetic medium for storing data;
a spindle motor control circuit for generating a plurality of spindle motor control signals, the spindle motor control circuit having:
a voltage-controlled oscillator for receiving an oscillator control signal and for generating an oscillator output signal;
a commutation state machine for receiving the oscillator output signal and for generating a plurality of transistor selection signals;
a multiplexor for receiving a mode selection signal, a pulse width modulation signal, and a first current control signal, for selecting one of the pulse width modulation signal and the first current control signal in response to the mode selection signal, and for generating an output signal equal to the selected one of the pulse width modulation signal and the first current control signal; and
a spindle predriver for receiving the transistor selection signals and the multiplexor output signal, and for generating the spindle motor control signals;
a spindle motor power circuit, for receiving the spindle motor control signals and for generating a plurality of spindle motor power signals; and
a spindle motor for receiving and being energized by the spindle motor power signals, and for controlling the rotation of the spindle.

9. The hard disk drive system of claim 8, wherein the spindle motor control circuit further comprises a phase detector for receiving a phase indication signal from the spindle motor, for receiving the transistor selection signals from the commutation state machine, and for generating the oscillator control signal.

10. The hard disk drive system of claim 8, wherein the spindle motor control circuit further comprises:
a current sensor for detecting a current conducted by the spindle motor, and for generating an output signal; and
a transconductance amplifier, for receiving a second current control signal and the output signal of the current sensor, and for generating the first current control signal.

11. The system of claim 10, wherein the current sensor comprises:
a resistor having first and second terminals, the first terminal being connected to a ground potential, for conducting the current conducted by the spindle motor to the ground potential; and
an output conductor connected to the second terminal of the resistor, for conducting the output signal of the current sensor.

12. The hard disk drive system of claim 8, wherein the spindle motor control signals comprise a low side control signal, the low side control signal being an analog signal proportional to the first current control signal if the first current control signal is selected, the low side control signal being a digital signal proportional to the pulse width modulation signal if the pulse width modulation signal is selected.

13. The hard disk drive system of claim 8, wherein the spindle motor power circuit comprises:
a first power transistor for receiving a first one of the spindle motor control signals, and for conducting a first current in response to the first spindle motor control signal from a voltage source to a first input port of the spindle motor;
a second power transistor for receiving a second one of the spindle motor control signals, and for conducting a second current from the first input port of the spindle motor in response to the second spindle motor control signal;
a third power transistor for receiving a third one of the spindle motor control signals, and for conducting a third current in response to the third spindle motor control signal from the voltage source to a second input port of the spindle motor;
a fourth power transistor for receiving a fourth one of the spindle motor control signals, and for conducting a fourth current from the second input port of the spindle motor in response to the fourth spindle motor control signal;
a fifth power transistor for receiving a fifth one of the spindle motor control signals, and for conducting a fifth current in response to the fifth spindle motor control signal from the voltage source to a third input port of the spindle motor; and
a sixth power transistor for receiving a sixth one of the spindle motor control signals, and for conducting a sixth current from the third input port of the spindle motor in response to the sixth spindle motor control signal.

14. A method for driving a hard disk drive spindle motor, comprising the steps of:

generating a mode selection signal;

generating a pulse width modulation signal;

generating a first current control signal;

receiving at a multiplexor the mode selection signal, the pulse width modulation signal and the first current control signal, selecting one of the pulse width modulation signal and the first current control signal in response to the mode selection signal, and generating an output signal equal to the selected one of the pulse width modulation signal and the first current control signal;

receiving at a spindle predriver the output signal of the multiplexor, and generating a plurality of spindle motor control signals;

receiving at a spindle motor power circuit the spindle motor control signals, and generating a plurality of spindle motor power signals; and receiving at a spindle motor the spindle motor power signals, and providing torque to a hard disk spindle.

15. The method of claim 14, wherein the step of generating the first current control signal comprises the steps of:

generating a second current control signal;

sensing at a current sensor a current conducted by the spindle motor, and generating a current level indication signal; and receiving at a transconductance amplifier the second current control signal and the current level indication signal, and generating the first current control signal.

16. The method of claim 14, wherein the step of receiving the spindle motor control signals and generating the spindle motor power signals comprises the steps of:

receiving at a gate terminal of a first power transistor a first one of the spindle motor control signals, and conducting a first current from a voltage source to a first input port of the spindle motor in response to the first spindle motor control signal;

receiving at a gate terminal of a second power transistor a second one of the spindle motor control signals, and conducting a second current from the first input port of the spindle motor to a ground potential in response to the second spindle motor control signal;

receiving at a gate terminal of a third power transistor a third one of the spindle motor control signals, and conducting a third current from the voltage source to a second input port of the spindle motor in response to the third spindle motor control signal;

receiving at a gate terminal of a fourth power transistor a fourth one of the spindle motor control signals, and conducting a fourth current from the second input port of the spindle motor to the ground potential in response to the fourth spindle motor control signal;

receiving at a gate terminal of a fifth power transistor a fifth one of the spindle motor control signals, and conducting a fifth current from the voltage source to a third input port of the spindle motor in response to the fifth spindle motor control signal; and receiving at a gate terminal of a sixth power transistor a sixth one of the spindle motor control signals, and conducting a sixth current from the third input port of the spindle motor to the ground potential in response to the sixth spindle motor control signal.

17. The method of claim 14, further comprising the steps of:

receiving at a voltage-controlled oscillator an oscillator control signal and generating an oscillator output signal; and receiving at a commutation state machine the oscillator output signal, generating a plurality of transistor selection signals, and transmitting the transistor selection signals to the spindle predriver.

18. The method of claim 17, further comprising the step of receiving at a phase detector the transistor selection signals and a phase indication signal from the spindle motor, and generating the oscillator control signal.

* * * * *